(12) United States Patent
Xiao et al.

(10) Patent No.: US 8,767,861 B2
(45) Date of Patent: Jul. 1, 2014

(54) MULTIPLE INPUT MULTIPLE OUTPUT AND BEAM-FORMING DATA TRANSMISSION METHOD AND DEVICE

(75) Inventors: Huahua Xiao, Shenzhen (CN); Dengkui Zhu, Shenzhen (CN); Zhaohua Lu, Shenzhen (CN); Kun Liu, Shenzhen (CN); Wanshuai Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/496,276

(22) PCT Filed: Jan. 27, 2010

(86) PCT No.: PCT/CN2010/070377
§ 371 (c)(1),
(2), (4) Date: Mar. 15, 2012

(87) PCT Pub. No.: WO2011/091586
PCT Pub. Date: Aug. 4, 2011

(65) Prior Publication Data
US 2012/0287981 A1    Nov. 15, 2012

(51) Int. Cl.
*H04B 7/02* (2006.01)
*H04L 1/02* (2006.01)

(52) U.S. Cl.
USPC ........................................................ 375/267

(58) Field of Classification Search
USPC .......... 375/267, 132, 260; 455/561, 296, 136, 455/562.1
See application file for complete search history.

(56) References Cited

U.S. PATENT DOCUMENTS

| | | | | |
|---|---|---|---|---|
| 6,317,611 | B1 * | 11/2001 | Kobayakawa | 455/561 |
| 2006/0193298 | A1 * | 8/2006 | Kishigami et al. | 370/338 |

(Continued)

FOREIGN PATENT DOCUMENTS

| | | |
|---|---|---|
| CN | 1953574 A | 4/2007 |
| CN | 101160749 A | 4/2008 |

(Continued)

OTHER PUBLICATIONS

Richi Kudo et al., Downlink Beamforming Method Using Broadband Channel State Information for MIMO-OFDM Systems; vol. 104;No. 396 (AP2004 153-178); p. 59-64(2004) Abstract.

(Continued)

*Primary Examiner* — Chieh M Fan
*Assistant Examiner* — Wednel Cadeau
(74) *Attorney, Agent, or Firm* — Harness, Dickey & Pierce, PLC

(57) ABSTRACT

The present invention provides a method and system for transmitting Multiple Input Multiple Output (MIMO) beam forming data. The method comprises: performing MIMO coding on data streams to obtain the coded data streams; obtaining weight values $W=(W_{i,j})_{Tx \times S}$ for beam forming of an antenna array of Tx×S of a transmitting end based on channel information from the antenna array of the transmitting end to antennas of a receiving end, where Tx is the number of transmitting antennas of the transmitting end, S is the number of the MIMO-coded data streams, and S≤Tx; and weighting the coded data streams with the weight values $W=(W_{i,j})_{Tx \times S}$ for beam forming, and transmitting the weighted data streams by corresponding antennas, where the data transmitted by antenna i is superposed data $$\sum_{j=1}^{S} W_{i,j} x_j, i = 1, \ldots, Tx, j = 1, \ldots, S,$$

and $x_j$ is $j^{th}$ coded data stream.

9 Claims, 2 Drawing Sheets

(56) References Cited

U.S. PATENT DOCUMENTS

2006/0203891 A1    9/2006   Sampath et al.
2007/0093273 A1    4/2007   Cai
2009/0180558 A1*   7/2009   Ma et al. ................ 375/260

FOREIGN PATENT DOCUMENTS

| | | |
|---|---|---|
| JP | 2002077012 A | 3/2002 |
| JP | 2004201296 A | 7/2004 |
| JP | 2007036403 A | 2/2007 |
| JP | 2008085897 A | 4/2008 |

OTHER PUBLICATIONS

International Search Report (in Chinese with English translation) for PCT/CN2010/070377, mailed Nov. 11, 2010; ISA/CN.

* cited by examiner

(a) Linear array antenna  (b) Dual-polarized antenna  (c) Cylindrical antenna

MULTIPLE INPUT MULTIPLE OUTPUT AND BEAM-FORMING DATA TRANSMISSION METHOD AND DEVICE

TECHNICAL FIELD

The present invention relates to the field of wireless communications, and in particular, to a method and device for transmitting downlink Multiple Input Multiple Output (MIMO) Beam Forming (BF) data.

BACKGROUND OF THE RELATED ART

Figure 1:
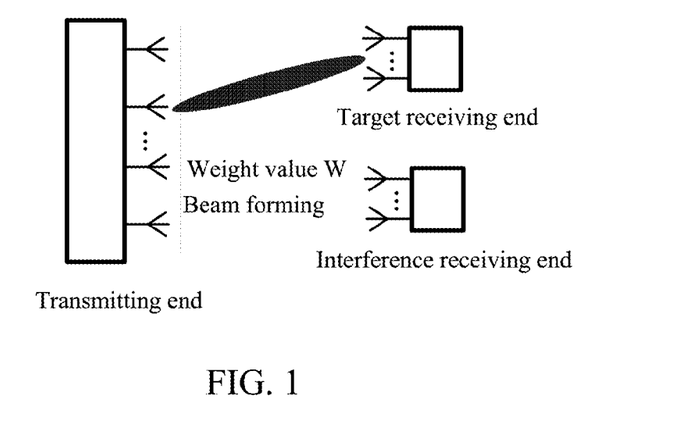
FIG. 1 is a schematic diagram of a BF system based on a linear antenna array according to an embodiment of the present invention.

Beam forming is based on the principle of adaptive antennas, which performs weighting processing on each antenna unit using an antenna array through advanced signal processing algorithms, so as to cause the array to align with a useful signal direction in real time, and form a zero point in an interference direction to suppress interference signals, thereby enhancing the signal to noise ratio, improving performance of a system and increasing coverage of the system, as shown in FIG. 1.

Figure 2:
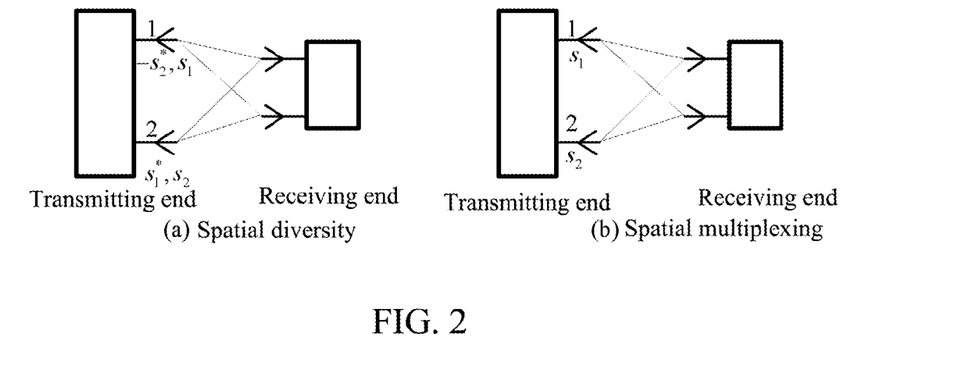
FIG. 2 is a schematic diagram of a MIMO system and one of its coding modes according to an embodiment of the present invention.

MIMO is a communication system in which multiple antennas are positioned in a transmitting end and a receiving end respectively. The MIMO can be mainly classified into two categories. When there are multiple antennas in the transmitting end or the receiving end and a data set transmitted by each transmitting antenna is the same, the receiving end combines the obtained signals from multiple branches, thereby improving the reliability of links. Such a MIMO technology is referred to as spatial diversity. In the case that there are two antennas in both the transmitting end and the receiving end, one of diversity coding modes is shown in FIG. 2(a), in which antenna 1 transmits symbols $s_1$ and $-s_2{}^*$ at two adjacent times (or sub-carriers) respectively, and antenna 2 transmits symbols $s_2$ and $s_1{}^*$ at two adjacent times (or sub-carriers) respectively. In addition, when there are multiple antennas at both the transmitting end and the receiving end, since a MIMO channel is equivalent to multiple parallel channels, multiple data streams can be transmitted in parallel simultaneously, thereby improving the data transfer rate. This is spatial multiplexing. In the case that there are two antennas in both the transmitting end and the receiving end, one of spatial multiplexing coding modes is shown in FIG. 2 (b), in which antenna 1 and antenna 2 transmit symbols $s_1$ and $s_2$ respectively on the same time-frequency resources.

Figure 3:
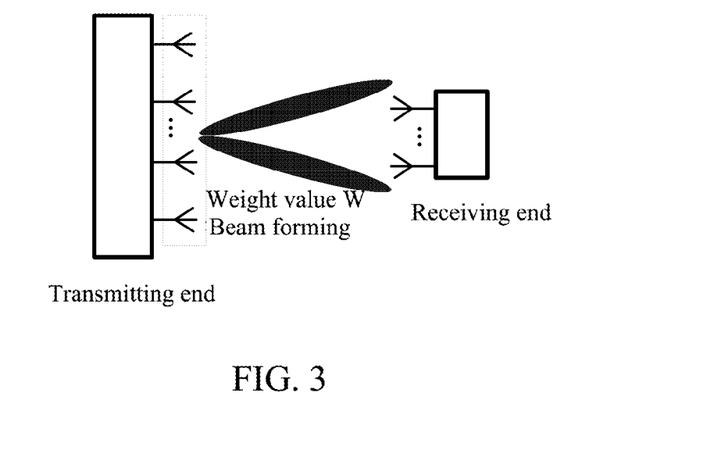
FIG. 3 is a schematic diagram of a MIMO and BF hybrid system based on a linear antenna array according to an embodiment of the present invention.

MIMO is combined with beam forming to form a new technology with advantages of the two technologies, which is referred to as MIMO beam forming, or MIMO+BF for short. It can not only suppress interference signals, like beam forming, but also enhance the reliability or transfer rate of links, like MIMO. A structure of one of MIMO beam forming systems is shown in FIG. 3. The entire antenna array forms S beams, each of which being equivalent to a virtual antenna. A MIMO system is constituted between virtual antennas. The combination of beam forming with spatial diversity can be referred to as spatial diversity beam forming; and the combination of beam forming with spatial multiplexing can be referred to as spatial multiplexing beam forming.

Acquirement of weight values W for MIMO beam forming is one of key technologies of MIMO beam forming. Accuracy and timeliness of the weight values W significantly influences performance of the MIMO beam forming.

SUMMARY OF THE INVENTION

The technical problem to be solved by embodiments of the present invention is to provide a method and device for transmitting MIMO beam forming data so as to implement an efficient combination of MIMO and beam forming, thus enhancing performance and coverage of a system furthest.

In order to solve the above problem, an embodiment of the present invention provides a method for transmitting Multiple Input Multiple Output (MIMO) beam forming data comprising:

performing MIMO coding on data streams to obtain the coded data streams;

obtaining weight values $W=(W_{i,j})_{Tx\times S}$ for beam forming of an antenna array of Tx×S of a transmitting end based on channel information from the antenna array of the transmitting end to antennas of a receiving end, where Tx is the number of transmitting antennas of the transmitting end, S is the number of the MIMO-coded data streams, and S≤Tx; and weighting the coded data streams with the weight values $W=(W_{i,j})_{Tx\times S}$ for beam forming, and transmitting the weighted data streams by corresponding antennas, where the data transmitted by antenna i is superposed data $$\sum_{j=1}^{S} W_{i,j}x_j, i=1, \ldots, Tx, j=1, \ldots, S,$$

and $x_j$ is $j^{th}$ coded data stream.

An embodiment of the present invention further provides a device for transmitting Multiple Input Multiple Output (MIMO) beam forming data comprising:

a MIMO coding module configured to perform MIMO coding on data streams to obtain the coded data streams;

a weight value estimating module configured to obtain weight values $W=(W_{i,j})_{Tx\times S}$ for beam forming of an antenna array of a transmitting end based on channel information from the antenna array of the transmitting end to antennas of a receiving end, where Tx is the number of transmitting antennas of the transmitting end, S is the number of the MIMO-coded data streams, and S≤Tx; and a beam forming module configured to weight the coded data streams with the weight values $W=(W_{i,j})_{Tx\times S}$ for beam forming, and transmit the weighted data streams by corresponding antennas, where the data transmitted by antenna i is superposed data $$\sum_{j=1}^{S} W_{i,j}x_j, i=1, \ldots, Tx, j=1, \ldots, S,$$

and $x_j$ is $j^{th}$ coded data stream.

Using the method and device according to the embodiments of the present invention, the weight values for MIMO beam forming can be obtained, and a reasonable combination of MIMO and beam forming can be implemented, thus improving system performance furthest.

PREFERRED EMBODIMENTS OF THE PRESENT INVENTION

Some terms used in embodiments of the present invention are defined as follows.

A transmitting end is a device for transmitting data or information, such as a macro base station, a micro base station, etc.

A receiving end is a device for receiving data or information, such as a terminal, a mobile station, a handheld device, a data card, etc.

An embodiment of the present invention provides a method for transmitting weight value and data for MIMO beam forming data comprising:

performing MIMO coding on data streams to obtain the coded data streams $X=(x_1, \ldots, x_S)^T$;

obtaining weight values $W=(W_{i,j})_{Tx \times S}$ for beam forming of an antenna array of $Tx \times S$ of a transmitting end based on channel information from the antenna array of the transmitting end to antennas of a receiving end, where Tx is the number of transmitting antennas of the transmitting end, S is the number of the MIMO-coded data streams, and $S \leq Tx$; and weighting the coded data streams with the weight values $W=(W_{i,j})_{Tx \times S}$ for beam forming, and transmitting the weighted data streams by corresponding antennas, where the data transmitted by antenna i is superposed data $$\sum_{j=1}^{S} W_{i,j} x_j, i = 1, \ldots, Tx, j = 1, \ldots, S.$$

The MIMO coding means that one or more data streams are transformed to form multiple data streams. MIMO coding includes spatial diversity coding or spatial multiplexing coding. The spatial diversity coding means that each input data stream is transformed into multiple copies and/or conjugates of the copies and/or negative conjugates of the copies. The spatial multiplexing coding means that one or more input data streams are output directly.

Before the weight values for beam forming are obtained based on the channel information, whether the weight values are required to be updated is further determined, and if they are required to be updated, the weight values $W=(W_{i,j})_{Tx \times S}$ for beam forming are obtained based on the channel information from the antenna array of the transmitting end to the antennas of the receiving end; otherwise, previously reserved weight values are used as the weight values for beam forming. The previously reserved weight values may be system pre-configured weight values, or may be weight values which are obtained based on the channel information last time.

The obtaining the weight values $W=(W_{i,j})_{Tx \times S}$ for beam forming of the antenna array of $Tx \times S$ of the transmitting end based on the channel information from the antenna array of the transmitting end to the antennas of the receiving end comprises the following steps.

In step 101, a statistic channel correlation matrix of the antenna array of the transmitting end is obtained based on the channel information.

In step 102, the weight values $W=(W_{i,j})_{Tx \times S}$ for beam forming of the antenna array of the transmitting end are determined based on the statistical channel correlation matrix.

Step 101 further comprises:

an initializing step comprising initializing the statistical channel correlation matrix $R_{stat}$ of the antenna array of the transmitting end, and determining a plurality of symbols which are used to calculate the statistical channel correlation matrix of the antenna array of the transmitting end;

an updating step comprising selecting a symbol, calculating a channel correlation matrix $$R = \sum_{k=1}^{N} \alpha_k (H(k))^H * H(k)$$

on a specific set of carriers on the currently selected symbol from the receiving end to the antenna array of the transmitting end, and updating the statistical channel correlation matrix $R_{stat} = \rho R_{stat} + (1-\rho)R$, where $H(k)$ is a channel coefficient matrix of $k^{th}$ sub-carrier in a specific set of carriers from the transmitting antennas of the antenna array of the transmitting end to the antennas of the receiving end, N represents the number of carriers contained in the specific set of carriers, $\alpha_k$ is a constant representing a weight of a correlation matrix of the $k^{th}$ sub-carrier, $\rho$ is a constant, and $0 \leq \rho \leq 1$, and a superscript H represents conjugate transposition of the matrix; and a controlling step comprising repeating the updating step until all of the plurality of symbols which are used to calculate the statistic channel correlation matrix of the antenna array of the transmitting end have been selected.

In the updating step, $H(k)$ is obtained in the following way:

the transmitting end measures a channel coefficient matrix of uplink channels from the antennas of the receiving end to the antenna array of the transmitting end, and obtains $H(k)$ of $Rx \times Tx$ from the measured channel coefficient matrix based on channel reciprocity, wherein the uplink channels include data channels on which the receiving end transmits uplink services, or uplink feedback channels on which the receiving end feeds back information to the transmitting end, or channels corresponding to sounding signals or pilot signals transmitted by the receiving end to the transmitting end;

or the receiving end measures a channel coefficient matrix from the antenna array of the transmitting end to receiving antennas of the receiving end and feeds back the channel coefficient matrix to the transmitting end, and the transmitting end obtains $H(k)$ of $Rx \times Tx$ based on the channel coefficient matrix which is fed back by the receiving end;

where Tx is the number of the transmitting antennas of the antenna array of the transmitting end, and Rx is the number of the receiving antennas of the receiving end.

One specific algorithm to obtain the statistic channel correlation matrix $R_{stat}$ will be described below.

(1) The statistic channel correlation matrix $R_{stat}$ is initialized, and a symbol index for the statistic channel correlation matrix is selected.

(2) A channel correlation matrix $$R = \sum_{k=1}^{N} \alpha_k H_{Rx,Tx}^H(k) * H_{Rx,Tx}(k)$$

on a specific set of carriers on a symbol corresponding to the current symbol index of the receiving terminal is calculated, where N represents the number of carriers contained in the specific set of carriers, $\alpha_k$ is a constant representing a weight of the channel correlation matrix of the $k^{th}$ sub-carrier, and $H_{Rx,Tx}(k)$ is a channel coefficient matrix of the $k^{th}$ sub-carrier in the specific set of carriers.

(3) The statistic channel correlation matrix is updated as $R_{stat}=f(R_{stat},R)$, where $f$ represents a function, preferably, $f(R_{stat},R)=\rho R_{stat}+(1-\rho)R$, $\rho$ is a constant and $0 \leq \rho \leq 1$, and the next symbol index is obtained.

(4) (2)-(3) are repeated until all symbols for obtaining the statistic channel correlation matrix have been selected, for example, if the statistic channel correlation matrix is obtained using a symbol of one frame, (2)-(3) are repeated until the frame ends to obtain the final statistic channel correlation matrix.

In step 102, the weigh values for beam forming can be obtained based on the statistic channel correlation matrix $R_{stat}$ using a fixed weight value method, an eigenvector weight value method and a constant modulus eigenvector weight value method. The final statistic channel correlation matrix can be obtained by the transmitting end, and the transmitting end obtains the weight values based on the statistic channel correlation matrix; or the receiving end can feed back the final statistic channel correlation matrix to the transmitting end after obtaining it, and the transmitting end obtains the weight values based on the final statistic channel correlation matrix; or the receiving end obtains the weight values or weight value indices based on the final statistic channel correlation matrix to feed back to the transmitting end after obtaining the final statistic channel correlation matrix, and the transmitting end obtains the weight values based on the weight values or weight value indices fed back by the receiving end.

(1) Fixed Weight Value Method

In a predetermined set of matrices $W_i$, $i=1, 2, \ldots, M$, one matrix is selected as weight values for MIMO beam forming according to a weight value selection principle, here, $W_i$, $i=1, 2, \ldots, M$ is a complex matrix of Tx×S, where Tx is the number of transmitting antennas, S is the number of the MIMO-coded data streams, and S≤Tx.

Preferably, the weight value selection principle may be based on the statistic channel correlation matrix $R_{stat}$.

Preferably, the weight value selection principle based on the statistic channel correlation matrix $R_{stat}$ may be based on the equation $$W_{opt} = \max_{W_i, i=1,\ldots,N} \det(W_i^H R_{stat} W_i),$$

i.e., $W_i$ with $\det(W_i^H R_{stat} W_i)$ being maximum is selected as a weight value for beam forming, where det calculates a determinant value of the matrix.

(2) Eigenvector Weight Value Method

The eigenvector weight value method comprises the following steps.

A) Eigenvalues of the statistic channel correlation matrix $R_{stat}$ are decomposed, and an eigenvector corresponding to an eigenvalue $\lambda_i$ is $W_i$, where $W_i$ is a vector of Tx×1, $i=1, 2, \ldots, Tx$, and Tx is the number of transmitting antennas of the transmitting end.

B) Eigenvectors corresponding to first S maximum eigenvalues are selected, each of the eigenvectors being one column of the matrix W, and the S eigenvectors forming a complex matrix W of Tx×S. W is used as a weight value for MIMO beam forming.

(3) Constant Modulus Eigenvector Method

The constant modulus eigenvector method comprises the following steps.

A) Eigenvalues of the statistic channel correlation matrix $R_{stat}$ are decomposed, and an eigenvector corresponding to an eigenvalue $\lambda_i$ is $W_i$, where $W_i$ is a vector of Tx×1, $i=1, 2, \ldots, Tx$, and Tx is the number of transmitting antennas of the transmitting end.

B) Eigenvectors corresponding to first S maximum eigenvalues are selected, each of the eigenvectors being one column of the matrix $\tilde{W}$, and the S eigenvectors forming a complex matrix $\tilde{W}$ of Tx×S.

C) Constant modulus processing is performed on the matrix $\tilde{W}$ to obtain $W=f_{cm}(\tilde{W})$, where $f_{cm}(\tilde{W})$ is used to perform constant modulus processing on the matrix $\tilde{W}$ such that the absolute value of each element in the processed matrix or vector is equal, and the matrix W with constant modulus is used as weight values for the MIMO beam forming.

Figure 5:
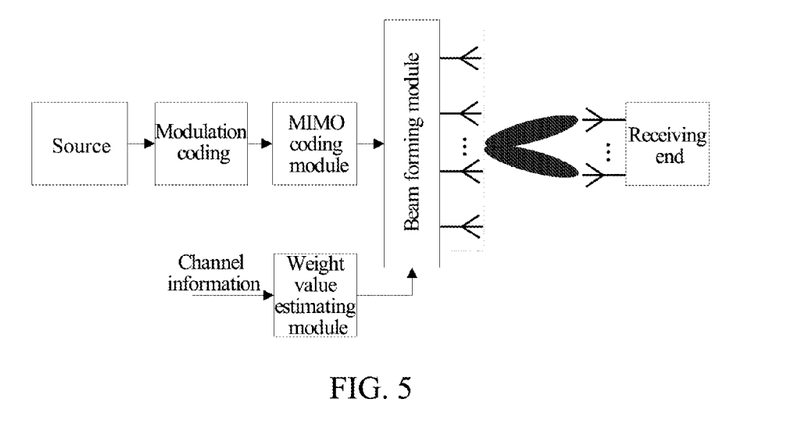
FIG. 5 is a schematic diagram of a MIMO beam forming device based on a linear antenna array according to an embodiment of the present invention.

An embodiment of the present invention further provides a device for transmitting MIMO beam forming data. As shown in FIG. 5, the device comprises:

a MIMO coding module configured to perform MIMO coding on data streams to obtain the coded data streams;

a weight value estimating module configured to obtain weight values $W=(W_{i,j})_{Tx \times S}$ for beam forming of an antenna array of a transmitting end based on channel information from the antenna array of the transmitting end to antennas of a receiving end, where Tx is the number of transmitting antennas of the transmitting end, S is the number of the MIMO-coded data streams, and S≤Tx; and a beam forming module configured to weight the coded data streams with the weight values $W=(W_{i,j})_{Tx \times S}$ for beam forming, and transmit the weighted data streams by corresponding antennas, where the data transmitted by antenna i is superposed data $$\sum_{j=1}^{S} W_{i,j} x_j, i = 1, \ldots, Tx, j = 1, \ldots, S.$$

and $x_j$ is $j^{th}$ coded data stream.

The weight value estimating module comprises:

a statistical channel correlation matrix obtaining unit configured to obtain a statistical channel correlation matrix of the antenna array of the transmitting end based on the channel information; and a weight value obtaining unit configured to determine the weight values $W=(W_{i,j})_{Tx \times S}$ for beam forming of the antenna array of the transmitting end based on the statistical channel correlation matrix.

The statistical channel correlation matrix obtaining unit comprises an initializing sub-unit, an updating sub-unit and a controlling sub-unit.

The initializing sub-unit is configured to initialize the statistical channel correlation matrix $R_{stat}$ of the antenna array of the transmitting end, and determine a plurality of symbols which are used to calculate the statistical channel correlation matrix of the antenna array of the transmitting end.

The updating sub-unit is configured to select a symbol, calculate a channel correlation matrix $$R = \sum_{k=1}^{N} \alpha_k (H(k))^H * H(k)$$

on a specific set of carriers on the currently selected symbol from the receiving end to the antenna array of the transmitting end, and update the statistical channel correlation matrix $R_{stat} = \rho R_{stat} + (1-\rho)R$, where H(k) is a channel coefficient matrix of $k^{th}$ sub-carrier in a specific set of carriers from the transmitting antennas of the antenna array of the transmitting end to the antennas of the receiving end, N represents the number of carriers contained in the specific set of carriers, $\alpha_k$ is a constant representing a weight of a correlation matrix of the $k^{th}$ sub-carrier, $\rho$ is a constant, and $0 \leq \rho \leq 1$, and a superscript H represents conjugate transposition of the matrix.

The controlling unit is configured to control the updating unit to repeat the update until all of the plurality of symbols which are used to calculate the statistic channel correlation matrix of the antenna array of the transmitting end have been selected.

The updating unit obtains H(k) in the following ways:

the updating sub-unit measures a channel coefficient matrix of uplink channels from the antennas of the receiving end to the antenna array of the transmitting end, and obtains H(k) of Rx×Tx from the measured channel coefficient matrix based on channel reciprocity;

or the receiving end measures a channel coefficient matrix from the antenna array of the transmitting end to receiving antennas of the receiving end and feeds back the channel coefficient matrix to the updating sub-unit, and the updating sub-unit obtains H(k) of Rx×Tx based on the channel coefficient matrix which is fed back by the receiving end;

where Tx is the number of the transmitting antennas of the antenna array of the transmitting end, and Rx is the number of the receiving antennas of the receiving end.

The uplink channels include data channels on which the receiving end transmits uplink services, or uplink feedback channels on which the receiving end feeds back information to the transmitting end, or channels corresponding to sounding signals or pilot signals transmitted by the receiving end to the transmitting end.

The weight value obtaining unit obtains the weight values $W=(W_{i,j})_{Tx \times S}$ for beam forming in one of the following ways.

The first way: $W_m$ with $\det(W_m^H R_{stat} W_m)$ being maximum is selected as a weight value for beam forming from a predetermined set of matrices $W_m$, m=1, 2, . . . , M, where det calculates a determinant value of the matrix, and $W_m$, m=1, 2, . . . , M is a complex matrix of Tx×S.

The second way: eigenvalues of the statistical channel correlation matrix $R_{stat}$ are decomposed, and eigenvectors corresponding to first S maximum eigenvalues are selected, each of the eigenvectors being one column of the matrix W, the S eigenvectors forming a complex matrix W of Tx×S, and W being a weight value for beam forming.

The third way: eigenvalues of the statistical channel correlation matrix $R_{stat}$ are decomposed, and eigenvectors corresponding to first S maximum eigenvalues are selected, each of the eigenvectors being one column of the matrix $\tilde{W}$, and the S eigenvectors forming a complex matrix $\tilde{W}$ of Tx×S, and constant modulus processing is performed on the matrix $\tilde{W}$ to obtain $W=f_{cm}(\tilde{W})$, W being a weight value for beam forming.

The MIMO coding module is configured to perform spatial diversity coding or spatial multiplexing coding on the data streams The weight value estimating module is configured to, before obtaining the weight values $W=(W_{i,j})_{Tx \times S}$ for beam forming based on the channel information from the antenna array of the transmitting end to the antennas of the receiving end, determine whether the weight values are required to be updated is further determined, and if the weight values are required to be updated, obtain the weight values $W=(W_{i,j})_{Tx \times S}$ for beam forming based on the channel information from the antenna array of the transmitting end to the antennas of the receiving end; otherwise, use system pre-configured weight values or last determined weight values as the weight values for beam forming.

Embodiment One

In this embodiment, linear array antennas are configured according to the present invention.

As shown in FIG. 4(a), multiple antennas are installed in a transmitting end or a receiving end, each antenna being in the same line in the same plane. Each antenna may be an omni-directional antenna which transmits electromagnetic waves in all directions or a directional antenna which transmits electromagnetic waves in a certain angle range, or a monopole antenna which is polarized in a certain direction.

Embodiment Two

In this embodiment, dual-polarized antennas are configured according to the present invention.

As shown in FIG. 4(b), multiple pairs of antennas are installed in a transmitting end or a receiving end, each pair of antennas being in the same line in the same plane. Each pair of antennas may be a pair of dual-polarized antennas which are polarized in a certain direction, for example, one polarized antenna of the pair of dual-polarized antennas is +45° polarized, and the other is −45° polarized.

Embodiment Three

In this embodiment, cylindrical antennas are configured according to the present invention.

As shown in FIG. 4(c), multiple antennas are installed in a transmitting end or a receiving end, each antenna being at the edge of one ellipse. Each antenna may be an omni-directional antenna which transmits electromagnetic waves in all directions or a directional antenna which transmits electromagnetic waves in a certain angle range, or a monopole antenna which is polarized in a certain direction.

Embodiment Four

In this embodiment, a channel coefficient matrix is obtained using channel reciprocity according to the present invention.

Figure 4:
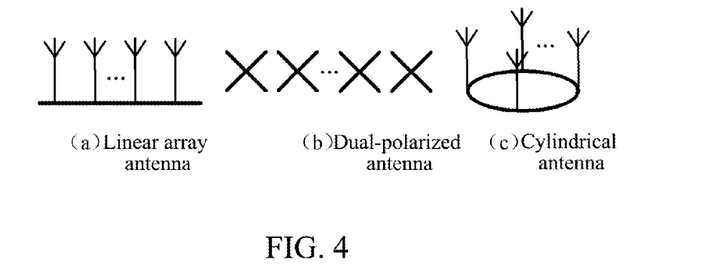
FIG. 4 is a schematic diagram of types of antennas of a transmitting end according to an embodiment of the present invention.

Tx antennas and Rx antennas are installed in a transmitting end and a receiving end respectively. Linear array antennas as shown in FIG. 4, or dual-polarized antennas, or cylindrical antennas may be configured. All or some of the installed antennas in the receiving end are used to transmit data streams to the transmitting end. The data streams may be information or pilot or sounding sequences or service data which is fed back by the receiving end to the transmitting end. Here, the number of the antennas of the receiving end for transmitting data streams is Rt, and Rt≤Rx. The transmitting end performs uplink channel estimation, and the estimated channel coefficient is $h_{i,j}(t,k)$, which represents a channel coefficient on $k^{th}$ sub-carrier at time t between antenna j of the receiving end for transmitting data and antenna i of the transmitting end, where i=1, . . . , Tx, j=1, . . . , Rt, t=1, . . . , Ts, k=1, . . . , N, and Ts and N represent the number of symbols of resources blocks for estimating weight values in time domain and the number of sub-carriers in frequency domain, respectively. The form of a matrix is represented as:

$$H_{UL}(t,k) = \begin{pmatrix} h_{1,1}(t,k) & \cdots & h_{1,Rt}(t,k) \\ \vdots & \ddots & \vdots \\ h_{Tx,1}(t,k) & \cdots & h_{Tx,Rt}(t,k) \end{pmatrix}_{Tx \times Rt},$$

Then, using the channel reciprocity, the downlink channel matrix from the transmitting end to the receiving end is $(H_{UL}(t,k))^T$, wherein T represents transposition of a matrix or a vector. The transmitting end obtains the weight values using a weight value estimating module and $(H_{UL}(t,k))^T$.

Embodiment Five

In this embodiment, a channel coefficient matrix is obtained using downlink feedback according to the present invention.

Tx antennas and Rx antennas are installed in a transmitting end and a receiving end respectively. Linear array antennas as shown in FIG. 4, or dual-polarized antennas, or cylindrical antennas may be configured. The receiving end estimates a channel coefficient $h_{i,j}(t,k)$ of the downlink from the transmitting end to the receiving end, which represents a channel coefficient on $k^{th}$ sub-carrier at time t between antenna j of the receiving end and antenna i of the transmitting end, where j=1, ..., Tx, i=1, ..., Rx, t=1, ..., Ts, k=1, ..., N, and Ts and N represent the number of symbols of resources blocks for estimating weight values in time domain and the number of sub-carriers in frequency domain, respectively. The form of a matrix is represented as:

$$H_{UL}(t,k) = \begin{pmatrix} h_{1,1}(t,k) & \cdots & h_{1,Rt}(t,k) \\ \vdots & \ddots & \vdots \\ h_{Tx,1}(t,k) & \cdots & h_{Tx,Rt}(t,k) \end{pmatrix}_{Tx \times Rt},$$

The receiving end either obtains weight values for beam forming, indices of the weight value indices or statistic channel correlation matrix using $H_{DL}(t,k)$ to feed back to the transmitting end, or feeds back $H_{DL}(t,k)$ or quantified $\tilde{H}_{DL}(t,k)$ to the transmitting end, and the transmitting end obtains the weight values for beam forming using $H_{DL}(t,k)$ or the quantified $\tilde{H}_{DL}(t,k)$.

Embodiment Six

In this embodiment, MIMO coding is performed using the first spatial diversity scheme according to the present invention.

There are Tx physical transmitting antennas in a transmitting end, and the whole antenna group is virtualized into two beams, each of which being a virtual antenna. The transmitted data streams are $s_1$ and $s_2$, and weight values for beam forming are:

$$W = \begin{pmatrix} w_{11} & w_{21} \\ \vdots & \vdots \\ w_{1Tx} & w_{2Tx} \end{pmatrix}$$

Figure 6:
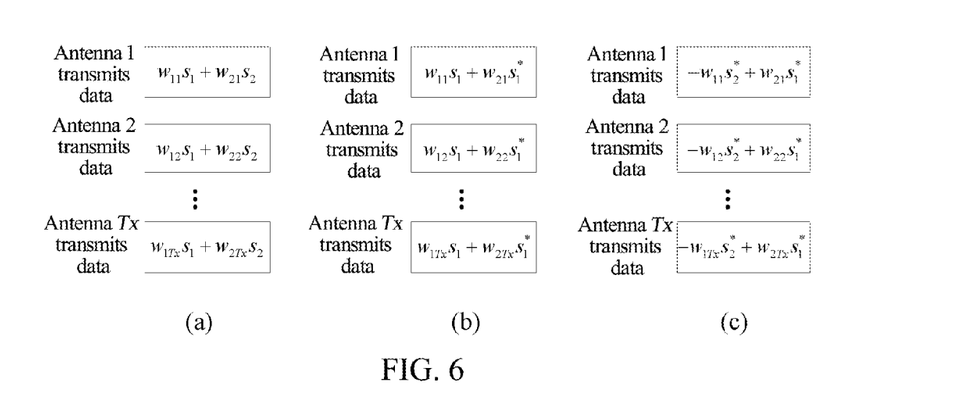
FIG. 6 is a schematic diagram of data streams transmitted by each physical antenna of a transmitting end on the same time-frequency resources.

In the case of spatial diversity, virtual antenna 1 transmits data streams $s_1$ and $-s_2^*$ at two adjacent times (or sub-carriers) respectively, and antenna 2 transmits data streams $s_2$ and $s_1^*$ at two adjacent times (or sub-carriers) respectively. That is, at the first time (or sub-carrier), in the case where the physical antennas are mapped to as shown in FIG. 6(a), the superposed data $w_{1i}s_1+w_{2i}s_2$ is transmitted by the $i^{th}$ antenna, and at the second time (or sub-carrier), in the case where the physical antennas are mapped to as shown in FIG. 6(c), the superposed data $-w_{1i}s_2^*+w_{2i}s_1^*$ is transmitted by the $i^{th}$ antenna, where i=1, ..., Tx.

Embodiment Seven

In this embodiment, MIMO coding is performed using the second spatial diversity scheme according to the present invention.

There are Tx physical transmitting antennas in a transmitting end, and the whole antenna group is virtualized into two beams, each of which being a virtual antenna. The transmitted data streams are $s_1$, and weight values for beam forming are:

$$W = \begin{pmatrix} w_{11} & w_{21} \\ \vdots & \vdots \\ w_{1Tx} & w_{2Tx} \end{pmatrix}$$

In the case of spatial diversity, virtual antenna 1 transmits data streams $s_1$ at a time (or sub-carrier), and virtual antenna 2 transmits data streams $s_1^*$ at the same time (or sub-carrier). That is, at the same time (or sub-carrier), in the case where the physical antennas are mapped to as shown in FIG. 6(b), the superposed data $w_{1i}s_1+w_{2i}s_1^*$ is transmitted by the $i^{th}$ antenna, where i=1, ..., Tx.

Embodiment Eight

In this embodiment, MIMO coding is performed using the spatial multiplexing scheme according to the present invention.

There are Tx physical transmitting antennas in a transmitting end, and the whole antenna group is virtualized into two beams, each of which being a virtual antenna. The transmitted data streams are $s_1$ and $s_2$, and weight values for beam forming are:

$$W = \begin{pmatrix} w_{11} & w_{21} \\ \vdots & \vdots \\ w_{1Tx} & w_{2Tx} \end{pmatrix}$$

In the case of spatial diversity, virtual antenna 1 transmits data streams $s_1$ at a time (or sub-carrier), and virtual antenna 2 transmits data streams $s_1^*$ at the same time (or sub-carrier). That is, at the same time (or sub-carrier), in the case where the physical antennas are mapped to as shown in FIG. 6(a), the superposed data $w_{1i}s_1+w_{2i}s_2$ is transmitted by the $i^{th}$ antenna, where i=1, ..., Tx.

Embodiment Nine

In this embodiment, weight values are obtained using a fixed weight value method according to the present invention.

A set of matrices (vectors) preset by a transmitting end is $W_i$, i=1, 2, ..., N, where $W_i$, i=1, 2, ..., N is a complex matrix of Tx×S, where Tx is the number of transmitting antennas, S is the number of MIMO coded data streams, and S≤Tx.

A weight value obtaining module of the transmitting end determines whether the weight values are required to be updated, and if the weight values are not required to be updated, the system pre-configured weight values or the last reserved weight values are used. If the weight values are required to be updated, the weight values are obtained using the fixed weight value method, steps of which will be described below.

(1) A statistic channel correlation matrix $R_{stat}$ is initialized. If the first frame is used, the statistic channel correlation matrix is initialized to be an all-zero matrix; otherwise, the statistic channel correlation matrix is initialized as the last reserved values. Symbol indices for the statistic channel correlation matrix are selected.

(2) A channel correlation matrix $$R = \sum_{k=1}^{N} H_{Rx,Tx}^{H}(k) * H_{Rx,Tx}(k)$$

on a specific set of carriers on symbols corresponding to the current symbol indices of a receiving end is calculated, where N represents the number of carriers contained in the specific set of carriers, $H_{Rx,Tx}(k)$ is a channel coefficient matrix of the $k^{th}$ sub-carrier in the specific set of carriers, Tx and Rx are the number of transmitting antennas of the transmitting end and the number of receiving antennas of the receiving end respectively, and a superscript H represents conjugate transposition of the matrix.

(3) The statistical channel correlation matrix is updated to be $R_{stat}=\rho R_{stat}+(1-\rho)R$, where $\rho$ is a constant and $0 \leq \rho \leq 1$, and 1 is added to the current symbol index.

(4) Steps (2)-(3) are repeated, until the present frame ends.

(5) The most suitable weight values $W_{opt}$ are selected as weight values for beam forming of the receiving end based on equation $$W_{opt} = \max_{W_i, i=1,\ldots,N} \det(W_i^H R_{stat} W_i),$$

where det calculates a determinant value of the matrix.

Embodiment Ten

In this embodiment, weight values are obtained using an eigenvector weight value method according to the present invention.

A weight value obtaining module of the transmitting end determines whether the weight values are required to be updated at, and if the weight values are not required to be updated, the system pre-configured weight values or the last reserved weight values are used. If the weight values are required to be updated, the weight values are obtained using the eigenvector weight value method, steps of which will be described below.

(1) A statistic channel correlation matrix $R_{stat}$ is initialized. If the first frame is used, the statistic channel correlation matrix is initialized to be an all-zero matrix; otherwise, the statistic channel correlation matrix is initialized as the last reserved values. Symbol indices for the statistic channel correlation matrix are selected.

(2) A channel correlation matrix $$R = \sum_{k=1}^{N} H_{Rx,Tx}^{H}(k) * H_{Rx,Tx}(k)$$

on a specific set of carriers on symbols corresponding to the current symbol indices of a receiving end is calculated, where N represents the number of carriers contained in the specific set of carriers, $H_{Rx,Tx}(k)$ is a channel coefficient matrix of the $k^{th}$ sub-carrier in the specific set of carriers, Tx and Rx are the number of transmitting antennas of the transmitting end and the number of receiving antennas of the receiving end respectively, and a superscript H represents conjugate transposition of the matrix.

(3) The statistical channel correlation matrix is updated to be $R_{stat}=\rho R_{stat}+(1-\rho)R$, where $\rho$ is a constant and $0 \leq \rho \leq 1$, and 1 is added to the current symbol index.

(4) Steps (2)-(3) are repeated, until the present frame ends.

(5) Eigenvalues of the statistic channel correlation matrix $R_{stat}$ are decomposed, and an eigenvector $W_i$ corresponds to an eigenvalue $\lambda_i$, where $W_i$ is a vector of Tx×1, i=1, 2, ..., Tx, and Tx is the number of transmitting antennas of the transmitting end.

(6) Eigenvectors corresponding to the first S maximum eigenvalues are selected, each of the eigenvectors being one column of the weight value matrix W for MIMO beam forming. The S eigenvectors form a complex matrix W of Tx×S. W is the weight values for MIMO beam forming.

Embodiment Eleven

In this embodiment, weight values are obtained using a constant modulus eigenvector method according to the present invention.

A weight value obtaining module of the transmitting end determines whether the weight values are required to be updated, and if the weight values are not required to be updated, the system pre-configured weight values or the last reserved weight values are used. If the weight values are required to be updated, the weight values are obtained using the constant modulus eigenvector method, steps of which will be described below.

(1) A statistic channel correlation matrix $R_{stat}$ is initialized. If the first frame is used, the statistic channel correlation matrix is initialized to be an all-zero matrix; otherwise, the statistic channel correlation matrix is initialized as the last reserved values. Symbol indices for the statistic channel correlation matrix are selected.

(2) A channel correlation matrix $$R = \sum_{k=1}^{N} H_{Rx,Tx}^{H}(k) * H_{Rx,Tx}(k)$$

on a specific set of carriers on symbols corresponding to the current symbol indices of a receiving end is calculated, where N represents the number of carriers contained in the specific set of carriers, $H_{Rx,Tx}(k)$ is a channel coefficient matrix of the $k^{th}$ sub-carrier in the specific set of carriers, Tx and Rx are the number of transmitting antennas of the transmitting end and the number of receiving antennas of the receiving end respectively, and a superscript H represents conjugate transposition of the matrix.

(3) The statistical channel correlation matrix is updated to be $R_{stat}=\rho R_{stat}+(1-\rho)R$, where $\rho$ is a constant and $0 \leq \rho \leq 1$, and 1 is added to the current symbol index.

(4) Steps (2)-(3) are repeated, until the present frame ends.

(5) Eigenvalues of the statistic channel correlation matrix $R_{stat}$ are decomposed, and an eigenvector $W_i$ corresponds to an eigenvalue $\lambda_i$, where $W_i$ is a vector of Tx×1, i=1, 2, ..., Tx, and Tx is the number of transmitting antennas of the transmitting end.

(6) Eigenvectors corresponding to the first S maximum eigenvalues are selected, each of the eigenvectors being one column of the weight value matrix $\tilde{W}$ for MIMO beam forming. The S eigenvectors form a complex matrix $\tilde{W}$ of Tx×S.

(7) Constant modulus processing is performed on the matrix $\tilde{W}$, such that $W=f_{cm}(\tilde{W})$, where $f$ represents the constant modulus processing, which makes the absolute value of each element in the processed matrix or vector be equal. Finally, one modulus matrix W is formed, and used as weight values for MIMO beam forming.

Embodiment Twelve

This is a specific embodiment of the whole scheme of the present invention.

A transmitting end is a base station, in which there are Tx antennas arranged in one linear array. A set of matrices (vectors) preset by the base station is $W_i$, i=1, 2, ..., N, here, $W_i$, i=1, 2, ..., N is a complex matrix of Tx×2, where Tx is the number of transmitting antennas.

There are M users under the base station, each user having two antennas. The base station performs the following operations for each user to implement MIMO beam forming.

Data streams transmitted by the base station to the users are input into a MIMO coding module. The MIMO coding module divides the data streams into groups each of which has two data streams denoted as $s_{i,1}$, $s_{i,2}$, which are coded by spatial diversity to obtain $$\begin{pmatrix} s_{i,1} & -s_{i,2}^* \\ s_{i,2} & s_{i,1}^* \end{pmatrix},$$

where i=1, ..., $N_s/2$, and $N_s$ is the length of the data stream.

A weight value estimating module calculates the weight value W, which is a matrix of Tx×2. The weight value estimating module determines whether the weight values are required to be updated, and if the weight values are not required to be updated, the system pre-configured weight values or the last reserved weight values are used. If the weight values are required to be updated, the weight values are obtained using the fixed weight value method, steps of which will be described below.

(1) A statistic channel correlation matrix $R_{stat}$ is initialized. If the first frame is used, the statistic channel correlation matrix is initialized to be an all-zero matrix; otherwise, the statistic channel correlation matrix is initialized as the last reserved values. Symbol indices for the statistic channel correlation matrix are selected.

(2) A channel correlation matrix $$R = \sum_{k=1}^{N} H_{Rx,Tx}^H(k) * H_{Rx,Tx}(k)$$

on a specific set of carriers on symbols corresponding to the current symbol indices of a receiving end is calculated, where N represents the number of carriers contained in the specific set of carriers, $H_{Rx,Tx}(k)$ is a channel coefficient matrix of the $k^{th}$ sub-carrier in the specific set of carriers, which is obtained by estimating a channel for transmitting sounding in the uplink, Tx and Rx are the number of transmitting antennas of the transmitting end and the number of receiving antennas of the receiving end respectively, and a superscript H represents conjugate transposition of the matrix.

(3) The statistical channel correlation matrix is updated to be $R_{stat}=\rho R_{stat}+(1-\rho)R$, where $\rho$ is a constant and $0 \le \rho \le 1$, and 1 is added to the current symbol index.

(4) Steps (2)-(3) are repeated, until the present frame ends.

(5) The most suitable weight values $W_{opt}$ are selected as weight values for beam forming of the receiving end based on equation $$W_{opt} = \max_{W_i, i=1,...,N} \det(W_i^H R_{stat} W_i),$$

where det calculates a determinant value of the matrix, and $$W = \begin{pmatrix} w_{11} & w_{21} \\ \vdots & \vdots \\ w_{1Tx} & w_{2Tx} \end{pmatrix}.$$

After the weight values are obtained, the data streams are weighted with the weight values. After the data streams are weighted, antenna j transmits $W_{1,j}s_{i,1}+W_{2,j}s_{i,2}$ at the first symbol time of a pair of times, and transmits $-W_{1,j}s_{i,2}^*+W_{2,j}s_{i,1}^*$ at the second symbol time, where j=1, ..., Tx, i=1, ..., $N_s/2$.

Embodiment Thirteen

This is another specific embodiment of the whole scheme of the present invention.

A transmitting end is a base station, in which there are Tx/2 antennas arranged in one linear array. There are M users under the base station, each user having two antennas. The base station performs the following operations for each user to implement MIMO beam forming.

Data streams transmitted by the base station to the user are input into a MIMO coding module. The MIMO coding module divides the data streams into groups each of which has two data streams denoted as $s_{i,1}$, $s_{i,2}$, which are coded by spatial diversity to obtain $$\begin{pmatrix} s_{i,1} \\ s_{i,2} \end{pmatrix},$$

where i=1, ..., $N_s/2$, and $N_s$ is the length of the data stream.

A weight value estimating module calculates the weight value W, which is a matrix of Tx×2. The weight value estimating module determines whether the weight values are required to be updated, and if the weight values are not required to be updated, the system pre-configured weight values or the last reserved weight values are used. If the weight values are required to be updated, the weight values are obtained using the fixed weight value method, steps of which will be described below.

(1) A statistic channel correlation matrix $R_{stat}$ is initialized. If the first frame is used, the statistic channel correlation matrix is initialized to be an all-zero matrix; otherwise, the statistic channel correlation matrix is initialized as the last reserved values. Symbol indices for the statistic channel correlation matrix are selected.

(2) A channel correlation matrix $$R = \sum_{k=1}^{N} H_{Rx,Tx}^H(k) * H_{Rx,Tx}(k)$$

on a specific set of carriers on symbols corresponding to the current symbol indices of a receiving end is calculated, where N represents the number of carriers contained in the specific set of carriers, $H_{Rx,Tx}(k)$ is a channel coefficient matrix of the $k^{th}$ sub-carrier in the specific set of carriers, Tx and Rx are the number of transmitting antennas of the transmitting end and the number of receiving antennas of the receiving end respectively, and a superscript H represents conjugate transposition of the matrix.

(3) The statistical channel correlation matrix is updated to be $R_{stat}=\rho R_{stat}+(1-\rho)R$, where $\rho$ is a constant and $0 \le \rho \le 1$, and 1 is added to the current symbol index.

(4) Steps (2)-(3) are repeated, until the present frame ends.

(5) Eigenvalues of the statistic channel correlation matrix $R_{stat}$ are decomposed, and an eigenvector $W_i$ corresponds to an eigenvalue $\lambda_1$, where $W_i$ is a vector of Tx×1, i=1, 2, ..., Tx, and Tx is the number of transmitting antennas of the transmitting end.

(6) Eigenvectors corresponding to the first S maximum eigenvalues are selected, each of the eigenvectors being one column of the weight value matrix W for MIMO beam forming. The S eigenvectors form a complex matrix W of Tx×S. W is the weight values for MIMO beam forming, where $$W = \begin{pmatrix} w_{11} & w_{21} \\ \vdots & \vdots \\ w_{1Tx} & w_{2Tx} \end{pmatrix}.$$

After the weight values are obtained, the data streams are weighted with the weight values. After the data streams are weighted, antenna j transmits $W_{1,j}s_{i,1}+W_{2,j}s_{i,2}$ at the same symbol time, where j=1, . . . , Tx, i=1, . . . , $N_s/2$.

Embodiment Fourteen

This is a generalized embodiment of the whole scheme according to the present invention.

A transmitting end is a base station in which there are Tx antennas, which are linear array antennas, or cylindrical antennas or dual-polarized antennas. There are M users under the base station, each user having Rx antennas. The base station performs the following operations for each user to implement MIMO beam forming.

Data streams transmitted by the base station to the user are MIMO coded. The MIMO coded data streams are $X_i=(x_{i,1}, \ldots, x_{i,S})^T$, where S is the number of data streams, i= 1, . . . , $N_s/S$, and $N_s$ is the total length of the data streams.

A weight value estimating module obtain the weight value W, which is a matrix of Tx×S.

After the weight values are obtained, the data streams are weighted with the weight values.

After the data streams are weighted, antenna j transmits $$\sum_{j=1}^{S} W_{i,j} s_{i,k}$$

at the same symbol time where j=1, . . . , Tx, i=1, . . . , $N_s/S$.

Industrial Applicability

Using the method and device in accordance with embodiments of the present invention, the weight values for MIMO beam forming can be obtained, and a reasonable combination of MIMO and beam forming is implemented, thereby improving system performance furthest.

What we claim is:

1. A method for transmitting Multiple Input Multiple Output (MIMO) beam forming data comprising:
   performing MIMO coding on data streams to obtain coded data streams;
   obtaining weight values $W=(W_{i,j})_{Tx\times S}$ for beam forming of an antenna array of Tx×S of a transmitting end based on channel information from the antenna array of the transmitting end to antennas of a receiving end, where Tx is the number of transmitting antennas of the transmitting end, S is the number of the MIMO-coded data streams, and S≤Tx; and
   weighting the coded data streams with the weight values $W=(W_{i,j})_{Tx\times S}$ for beam forming, and transmitting the weighted data streams by corresponding antennas, where the data transmitted by antenna i is superposed data $$\sum_{j=1}^{S} W_{i,j} x_j, i=1, \ldots, Tx, j=1, \ldots, S,$$

and $x_j$ is $j^{th}$ coded data stream; wherein obtaining the weight values comprises (a) or (b), wherein (a) comprises:
   (i) obtaining a statistical channel correlation matrix of the antenna array of the transmitting end based on the channel information, comprises:
      (1) initializing the statistical channel correlation matrix $R_{stat}$ of the antenna array of the transmitting end, and determining a plurality of symbols which are used to calculate the statistical channel correlation matrix of the antenna array of the transmitting end;
      (2) selecting a symbol, calculating a channel correlation matrix $$R = \sum_{k=1}^{N} \alpha_k H_{Rx,Tx}^H(k) * H_{Rx,Tx}(k)$$

on a specific set of carriers on the currently selected symbol from the transmitting end to the antenna array of the receiving end, and updating the statistical channel correlation matrix $R_{stat}=\rho R_{stat}+(1-\rho)R$, where H(k) is a channel coefficient matrix of the $k^{th}$ sub-carrier in a specific set of carriers from the transmitting antennas of the antenna array of the transmitting end to the antennas of the receiving end, N represents the number of carriers contained in the specific set of carriers, $\alpha_k$ is a constant representing a weight of a correlation matrix of the $k^{th}$ sub-carrier, $\rho$ is a constant, and $0 \le \rho \le 1$, and a superscript H represents conjugate transposition of the matrix, Rx is the number of the receiving antennas of the receiving end;
      (3) repeating the updating step until all of the plurality of symbols which are used to calculate the statistic channel correlation matrix of the antenna array of the transmitting end have been selected ; and
   (ii) determining the weight values $W=(W_{i,j})_{Tx\times S}$ for beam forming of the antenna array of the transmitting end based on the statistical channel correlation matrix;
and wherein (b) comprises:
   (i) obtaining a statistical channel correlation matrix of the antenna array of the transmitting end based on the channel information; and
   (ii) determining the weight values $W=(W_{i,j})_{Tx\times S}$ for beam forming of the antenna array of the transmitting end based on the statistical channel correlation matrix $W=(W_{i,j})_{Tx\times S}$ in one of the following ways:
      (1) a first way: $W_m$ with $det(W_m^H R_{stat} W_m)$ being maximum is selected as a weight value for beam forming from a predetermined set of matrices $W_m$, m=1, 2, . . . , M, where det calculates a determinant value of the matrix, and $W_m$, m=1, 2, . . . , M, is a complex matrix of Tx×S;
      (2) a second way: $R_{stat}$ Tx×S
   eigenvalues of the statistical channel correlation matrix $R_{stat}$ are decomposed, and eigenvectors corresponding to first S maximum eigenvalues are selected, each of the eigenvectors being one column of the matrix $\tilde{W}$, and the S eigenvectors forming a complex matrix $\tilde{W}$ of Tx×S, and constant modulus processing is performed on the matrix $\tilde{W}$ to obtain $W=f_{cm}(\tilde{W})$, W being a weight value for beam forming, wherein $f_{cm}(\tilde{W})$ is used for performing constant modulus processing on the matrix $\tilde{W}$.

2. The method according to claim 1, wherein $H_{Rx,Tx}(k)$ is obtained in the following ways:

the transmitting end measures a channel coefficient matrix of uplink channels from the antennas of the receiving end to the antenna array of the transmitting end, and obtains $H_{Rx,Tx}(k)$ of Rx×Tx from the measured channel coefficient matrix based on channel reciprocity;

or the receiving end measures a channel coefficient matrix from the antenna array of the transmitting end to receiving antennas of the receiving end and feeds back the channel coefficient matrix to the transmitting end, and the transmitting end obtains $H_{Rx,Tx}(k)$ of Rx×Tx based on the channel coefficient matrix which is fed back by the receiving end Tx Rx.

3. The method according to claim 2, wherein the uplink channels include data channels on which the receiving end transmits uplink services, or uplink feedback channels on which the receiving end feeds back information to the transmitting end, or channels corresponding to sounding signals or pilot signals transmitted by the receiving end to the transmitting end.

4. The method according to claim 1, wherein performing MIMO coding on the data streams means that spatial diversity coding or spatial multiplexing coding is performed on the data streams.

5. The method according to claim 1, wherein before the weight values $W=(W_{i,j})_{Tx\times S}$ for beam forming are obtained based on the channel information from the antenna array of the transmitting end to the antennas of the receiving end, whether the weight values are required to be updated is further determined, and if the weight values are required to be updated, the weight values $W=(W_{i,j})_{Tx\times S}$ for beam forming are obtained based on the channel information from the antenna array of the transmitting end to the antennas of the receiving end; otherwise, the coded data streams is weighted with system pre-configured weight values or last determined weight values as the weight values for beam forming and the weighted data streams is transmitted.

6. A device for transmitting Multiple Input Multiple Output (MIMO) beam forming data comprising:
a MIMO coding module configured to perform MIMO coding on data streams to obtain the coded data streams;
a weight value estimating module configured to obtain weight values $W=(W_{i,j})_{Tx\times S}$ for beam forming of an antenna array of a transmitting end based on channel information from the antenna array of the transmitting end to antennas of a receiving end, where Tx is the number of transmitting antennas of the transmitting end, S is the number of the MIMO-coded data streams, and S≤Tx; and
a beam forming module configured to weight the coded data streams with the weight values $W=(W_{i,j})_{Tx\times S}$ for beam forming, and transmit the weighted data streams by corresponding antennas, where the data transmitted by antenna i is superposed data $$\sum_{j=1}^{S} W_{i,j} x_j, i = 1, \ldots, Tx, j = 1, \ldots, S,$$

and $x_j$ is $j^{th}$ coded data stream;
wherein the weight value estimating module comprises (a) or (b),
wherein (a) comprises:
(i) a statistical channel correlation matrix obtaining unit configured to obtain a statistical channel correlation matrix of the antenna array of the transmitting end based on the channel information comprises an initializing sub-unit, an updating sub-unit and a controlling sub-unit, wherein
(1) the initializing sub-unit is configured to initialize the statistical channel correlation matrix $R_{stat}$ of the antenna array of the transmitting end, and determine a plurality of symbols which are used to calculate the statistical channel correlation matrix of the antenna array of the transmitting end;
(2) the updating sub-unit is configured to select a symbol, calculate a channel correlation matrix $$R = \sum_{k=1}^{N} \alpha_k H_{Rx,Tx}^H(k) * H_{Rx,Tx}(k)$$

on a specific set of carriers on the currently selected symbol from the transmitting end to the antenna array of the receiving end, and update the statistical channel correlation matrix $R_{stat}=\rho R_{stat}+(1-\rho)R$, where $H_{Rx,Tx}(k)$ is a channel coefficient matrix of the $k^{th}$ sub-carrier in a specific set of carriers from the transmitting antennas of the transmitting end to the antennas of the receiving end, N represents the number of carriers contained in the specific set of carriers, $\alpha_k$ is a constant representing a weight of a correlation matrix of the $K^{th}$ sub-carrier, $\rho$ is a constant, and $0\leq\rho\leq1$, and a superscript H represents conjugate transposition of the matrix, Rx is the number of the receiving antennas of the receiving end; and
(3) the controlling unit is configured to control the updating unit to repeat the update until all of the plurality of symbols which are used to calculate the statistic channel correlation matrix of the antenna array of the transmitting end have been selected; and
(ii) a weight value obtaining unit configured to determine the weight values $W=(W_{i,j})_{Tx\times S}$ for beam forming of the antenna array of the transmitting end based on the statistical channel correlation matrix;

and wherein (b) comprises:
(i) a statistical channel correlation matrix obtaining unit configured to obtain a statistical channel correlation matrix of the antenna array of the transmitting end based on the channel information; and
(ii) a weight value obtaining unit configured to determine the weight values $W=(W_{i,j})_{Tx\times S}$ for beam forming of the antenna array of the transmitting end based on the statistical channel correlation matrix in one of the following ways:
(1) a first way: $W_m$ with $\det(W_m^H R_{stat} W_m)$ being maximum is selected as a weight value for beam forming from a predetermined set of matrices $W_m$, m=1, 2, ..., M, where det calculates a determinant value of the matrix, and $W_m$, m=1, 2, ..., M is a complex matrix of Tx×S;
(2) a second way: $R_{stat}$ Tx×S
eigenvalues of the statistical channel correlation matrix $R_{stat}$ are decomposed, and eigenvectors corresponding to first S maximum eigenvalues are selected, each of the eigenvectors being one column of the matrix $\tilde{W}$, and the S eigenvectors forming a complex matrix $\tilde{W}$ of Tx×S, and constant modulus processing is performed on the matrix $\tilde{W}$ to obtain $W=f_{cm}(\tilde{W})$, W being a weight value for beam forming, wherein $f_{cm}(\tilde{W})$ is used for performing constant modulus processing on the matrix $\tilde{W}$.

7. The device according to claim 6, wherein the updating unit obtains H(k) in the following ways:
the updating sub-unit measures a channel coefficient matrix of uplink channels from the antennas of the receiving end to the antenna array of the transmitting end, and obtains $H_{Rx,Tx}(k)$ of Rx×Tx from the measured channel coefficient matrix based on channel reciprocity;
or the receiving end measures a channel coefficient matrix from the antenna array of the transmitting end to receiving antennas of the receiving end and feeds back the channel coefficient matrix to the updating sub-unit, and the updating sub-unit obtains $H_{Rx,Tx}(k)$ of Rx×Tx based on the channel coefficient matrix which is fed back by the receiving end Tx Rx.

8. The device according to claim 7, wherein the uplink channels include data channels on which the receiving end transmits uplink services, or uplink feedback channels on which the receiving end feeds back information to the transmitting end, or channels corresponding to sounding signals or pilot signals transmitted by the receiving end to the transmitting end.

9. The device according to claim 6, wherein the weight value estimating module is configured to, before obtaining the weight values $W=(W_{i,j})_{Tx \times S}$ for beam forming based on the channel information from the antenna array of the transmitting end to the antennas of the receiving end, determine whether the weight values are required to be updated is further determined, and if the weight values are required to be updated, obtain the weight values $W=(W_{i,j})_{Tx \times S}$ for beam forming based on the channel information from the antenna array of the transmitting end to the antennas of the receiving end; otherwise, use system pre-configured weight values or last determined weight values as the weight values for beam forming.

* * * * *